Oct. 2, 1928.

S. G. STUCKEY 1,686,109

GLASS FEED CONTROL MECHANISM

Filed May 5, 1926

Inventor
Samuel G. Stuckey,
By Murray & Zugelter
Attorneys.

Patented Oct. 2, 1928.

1,686,109

UNITED STATES PATENT OFFICE

SAMUEL G. STUCKEY, OF MIDDLETOWN, OHIO.

GLASS-FEED-CONTROL MECHANISM.

Application filed May 5, 1926. Serial No. 106,935.

This invention relates to an improved apparatus for controlling the feed of molten glass and has for an object the provision of means whereby a properly shaped gathering of glass may be attained.

Another object is to provide a device for the proper state which will gather the required weight of glass at each gathering without the use of a measuring cup.

Another object is to provide a device of this kind which eliminates the necessity for moving parts at the discharge port thereof.

Another object is to provide a device of this kind which will properly form a glass gathering as it is discharged and sheared and which will immediately and automatically retard further flow for a predetermined interval.

These and other objects are attained by the means described herein and disclosed in the accompanying drawings, in which:

Fig. 3, is a fragmental view taken on line 3—3 of Fig. 1.

Fig. 4, is a view taken on line 4—4 of Fig. 2.

Figure 1:
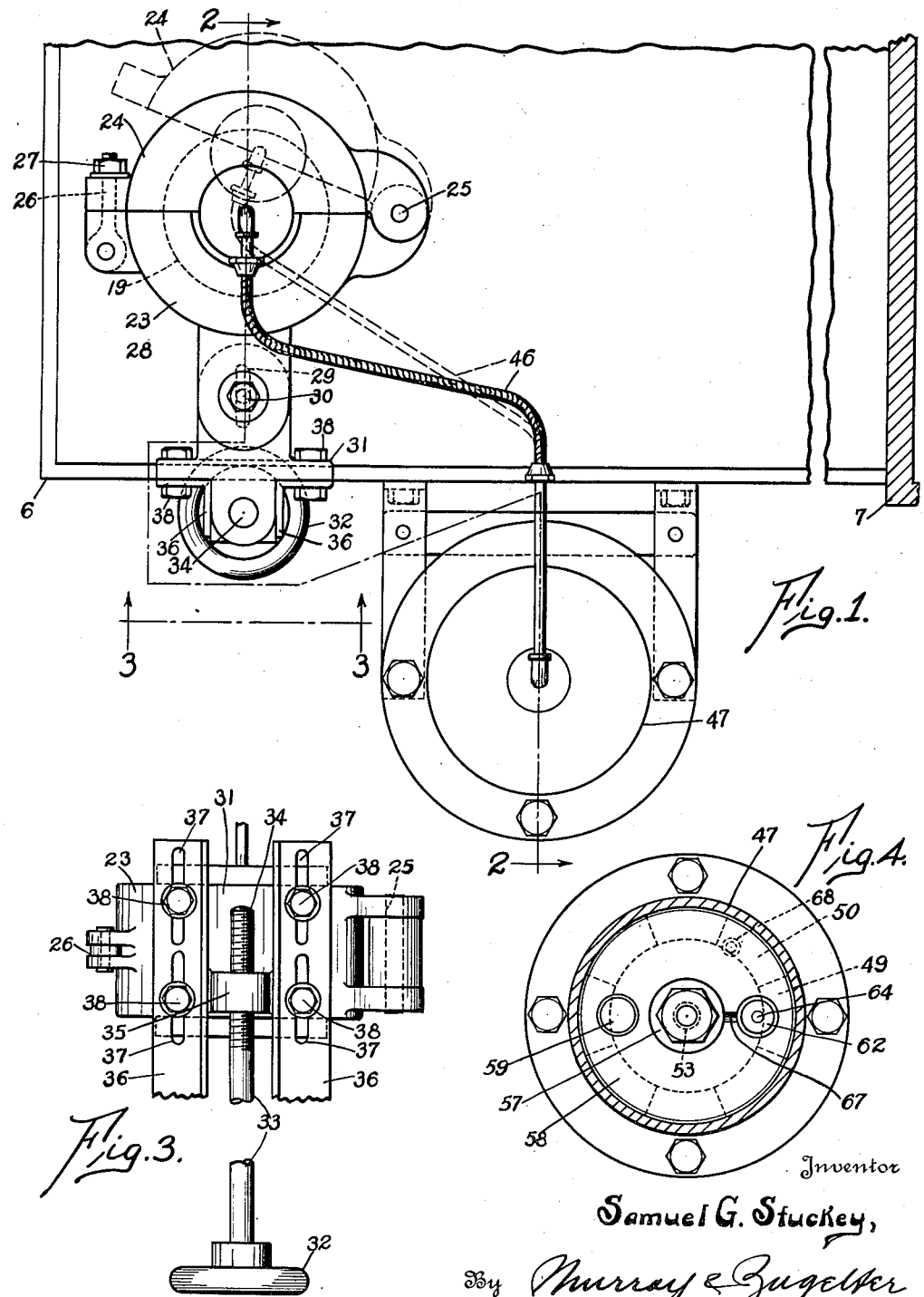
Fig. 1, is a top plan view of a device of my invention embodied in a glass furnace.

In the device of my invention a metal housing 6 is mounted in communication with a glass furnace 7. An opening 8 in the bottom wall 9 of housing 6 has a perforate clay insert 10 seated therein, the bore 11 of which is of such diameter as is required to discharge a glass gathering or gob 12 of the desired size. Inserts 10 are provided with different sizes of bores and are interchangeable. A clay lining member 13 seats on bottom wall 9 and about insert 10 to provide a well 14 into which molten glass 15 flows from the glass furnace. The well 14 has its side walls built up above the normal glass level with suitable fire brick 16 upon which a cover 17 is mounted. The cover 17 has an opening 18 in alignment with the bore 8 in the bottom wall 9 and a vertical clay tube 19 extends downwardly through opening 18 with the bottom 20 thereof adjustably spaced from enlarged counter bore 21 in insert 10. Tube 19 is flanged as at 22 where a divided clamp 23—24, hinged at 25, is closed about it for supporting it in the well. A pivotally mounted threaded stud 26 and a nut 27 retain the clamp members in locked position. The clamp-member 24 may be moved away from member 23 to permit the removal of tube 19, (see Fig. 1.) The clamp structure carries a lug 28 having an elongated slot 29 for receiving a securing bolt 30 which serves to adjustably mount the clamp upon a bracket 31. The bracket 31 (see Figs. 1 and 3) may be raised and lowered for effecting vertical movement of the tube 19 by turning hand wheel 32 on rod 33, the threaded hand 34 of which passes through a threaded bore in projection 35 of said bracket. A pair of angle irons 36 are secured in vertical parallelism to housing 6 and are slotted as at 37 so that clamp bolts 38 may serve to guide the bracket vertically and lock it in any of its adjusted positions.

The reduced neck portion 39 of clamp 23—24, is threaded for receiving the threaded collar 40 in which a flanged tube 41 is placed with flange 42 thereof resting upon an asbestos washer 43 which is seated on the top of tube 19 surrounding the reduced bore 44 communicating with the bore 45 in said tube. This provides an airtight coupling between tube 19 and a flexible hose 46 which is connected to an actuating mechanism of my invention.

The actuating mechanism comprises a means whereby the molten glass 15 is controlled by alternate compression and exhausting of the air in the hollow tube 19 and providing communication between the interior of the tube and the atmosphere between each compression and exhaustion thereof. In order to govern the size and shape of the glass gathering accurately, I have provided a mechanism which operates automatically and uniformly and which is adapted to fine adjustment. In the herein disclosed embodiment a cylinder 47 communicates at one end 48 with tube 19 through the flexible tube 46, suitable pipe fittings and couplings being employed for the purpose. The opposite end of the cylinder 47 is open and is secured to a support 49 having openings 50 therein. The base 51 of support 49 has an annular packing box 52 in which a piston rod 53 is reciprocated by a suitable synchronized powered mechanism. A piston 54 provided with peripheral packing rings 55 is secured to the reduced end 56 of piston rod 53 by means of lock nuts disposed in recess 57 in the top face 58 of piston. From the foregoing, it will be apparent that as the piston 54 is reciprocated in the cylinder 47 the air in the hollow interior 45 of tube 19 will be alternately compressed and exhausted. For the reason heretofore explained, it is necessary that the interior of the tube 19 be placed in communication with the atmosphere at the end of each compression and each exhausting operation. This is accomplished at the end of the exhaust stroke, by a poppet valve 59 which finds its seat below the top face 58 of the piston and has an elongated stem 60 extending through an over-size bore 61 in the piston. A second poppet valve 62 controls a passage 63 through said piston and operates, at the end of the compression stroke, from the opposite face of said piston. The stem 64 of valve 62 is normally projected for a distance above the top face of the piston so that said valve is unseated against the resistance of a spring 65 housed within the body lines of the piston, when the end of the stem 64 abuts the face 66 of the cylinder. From the foregoing it will be noted that as the piston moves upwardly toward the end face 66 of the cylinder the air therein will be compressed and the pressure transmitted through flexible tube 46 to the air in the hollow interior 45 of the tube 19 so that it will exert pressure upon the glass within said tube and force an additional quantity of glass through the opening 11 in the insert. This keeps the glass gathering 12 in proper shape and precludes it from threading off and breaking under its own weight. By regulating the compression stroke of the piston 54 and providing a proper discharge bore 11 in the insert 10 it is possible to present a glass gathering 12 of exact weight and shape required for a given mold in a glass making machine. As soon as the proper glass gathering has been projected through port 11 the stem 64 of valve 62 abuts the face 66 of the cylinder and permits immediate discharge of the heated and compressed air in the tube 19 and at the same time removes the pressure from the glass gathering 12 which may then be sheared off. A groove 67 in the top face 58 of the piston provides communication between the recess 57 and the bore 63 which communicates with the atmosphere beneath the piston whenever the valve 62 is unseated.

One or more guide rods 68 depending from piston 54 pass through the outer flange portion of base 51 to preclude rotation of the piston. The stem 60 of valve 59 is normally retained upon its seat by a spring 69 abutting the piston and a collar 70 on the stem. The end 71 of stem contacts an adjustable stop 72 which, in the present embodiment, takes the form of a rod 73 associated with the power mechanism hereinafter described.

From the foregoing it will be apparent that the compression of the air in tube 19 is followed by a release of the pressure during the time in which the valve 62 provides communication with the atmosphere. As the piston 54 moves away from face 66 of the cylinder, valve 62 is again permitted to seat after which further movement of the piston will exhaust air from the hollow interior 45 of tube 19 and will draw the glass upwardly in the tube, so that there will be an upward pressure through the port 11 due to the suction in the tube. This action efficiently stops the flow of glass through the port for an interval during which the piston 54 moves downwardly. The stoppage of the flow of glass through port 11 is immediately after the shears 74 have severed the gathering 12. When the piston has reached its predetermined lowest position, the end 71 of valve stem 60 abuts the stop 72 and breaks the vacuum by unseating valve 59 whereupon the molten glass again begins to flow through port 11. The gathering of glass is controlled when the piston again moves upwardly, permitting the seating of the valve 59, which results in the compression of the air. It will be evident from the foregoing that by accurately regulating the movements of the piston 54 the gatherings 12 may be accurately manipulated and the flow accelerated or retarded at the proper times.

It should be noted that the purpose of the tube 19 is such that it performs the function of retaining a column of molten glass in constant communication with the main body at the lower end.

The upper end of this chamber communicates the alternate suction and compression of the cylinder to the glass in the tube. The lower end of the tube covers the discharge port but is adjusted by means of a hand wheel 32 and screw 33 to a height which will cause the suction to assist the gravity pressure in taking in a new charge of glass, there being a greater area within the chamber 45 in tube 19 than the area between the end 20 of the tube and the top of insert 10. The suction or exhausting of air lifts the column of glass at the same time that it draws a new charge into position.

It will be seen that the tube 46 and the immediately associated parts constitute a free air conduit between the chamber 45 in the tube 19 and the chamber above the piston 54, which conduit is neither vented, nor provided with valves in any part of its course, nor obstructed in any way whatever. This is desirable in order that the actions due to the movements of the piston 54, may be immediately and fully communicated to the chamber 45. The valves 59 and 62, that control the breaking of the vacuum and the release of the compression due to the movements of the piston 54, are as distant from the chamber 45 as it is possible to locate them and are enclosed by the cylinder 47 so as to be protected from any unauthorized manipulation. These valves, when once set or adjusted, are adjusted for the life of the machine, which is practical as well as desirable, since their movements always take place at the ends of the strokes of the piston, whether these be long or short, rapid or slow. The arrangement described makes it possible to locate the control piston 54 in any position and at any distance from the tube 19, which has decided practical advantages.

It will be further observed that the area of the piston 54 is materially greater than the cross sectional area of the chamber 45 in the tube 19. The reason for this is: that since the lower open end of the tube is opposite to the port or orifice 11 through which the gatherings are delivered, and since there is a tendency on the part of the molten glass to constantly flow through said opening by gravity, in order to properly control the gathers, the volume of air that is moved by the piston 54 must be sufficient to effect the desired results, notwithstanding the tendency of the glass to constantly flow by gravity through the opening 11; and I have discovered that, unless the area of the piston 54 be much greater than the area of the surface of glass acted upon by the air in the chamber 45, the desired regulation will not be successfully secured. This will be apparent when it is considered that unless the volume of air delivered to the chamber 45 be sufficient to move the glass within the tube 19 faster than it flows by gravity, the effect of the air will be negligible. On the other hand, when the reverse stroke takes place the desired vacuum to act against the natural flow of the glass is easily secured by using a relatively large piston 54.

The power means for imparting an accurately regulated reciprocation to the piston 54 may be of any suitable construction. In view of the fact that there is almost always available a supply of air under pressure in connection with glass making machines the hereinafter described power unit may be employed to advantage.

A cylinder 75 is closed at its upper end by the base 51 of support 49 and has the piston rod 53 reciprocable therein. A suitable piston 76 is secured to the end of the piston rod within the cylinder 75 and is adapted to be moved in opposite directions therein through the agency of intermittent charges of air under pressure directed to opposite ends of said cylinder to which are connected pipe 77 and flexible tube 78 respectively. These are in turn connected to the available source of air under pressure (not shown) heretofore mentioned.

The pipe 77 is connected through a suitable port 79 with the top of the cylinder above the piston 76. The lower end head or closing member for the cylinder 75 comprises a heavy leather cupped washer 80 which is retained against the wall of the cylinder by a circular spring member 81, thereby providing an adjustable closure for the bottom of the cylinder which serves to limit the downward movement of piston 76 and also of piston 54. This adjustment is provided by providing a perforate flanged end plate 82 secured to the cylinder 75 through which a threaded tubular member 83 extends. The member 83 has a key slot 84 disposed in the direction of its length and a key 85 in the bore in flanged end plate 82 precludes rotation of the member 83. A hand wheel 86 is internally threaded for receiving the threads on the member 83. The said wheel has a flange 87 which rides on interior ledge of box housing 88 which is secured to the end plate 82. This structure retains the hand wheel 86 against longitudinal movement relative to the cylinder 75 so that rotation of the hand wheel will raise and lower the externally threaded member 83 into and out of the cylinder 75. The end of member 83 is provided with a stop 89 beneath which the cupped member 80 is secured. The flexible supply tube 78 is connected with the opposite end of the member 83 for directing air under pressure through the bore 90 in said member for supplying pressure in the cylinder 75 below the piston 76 and consequently the stroke of the piston 54 may be accurately adjusted by turning the hand wheel 86 to advance the cup 80 toward or withdraw it from the base plate 51 at the top of the cylinder.

The valve 59 serves to break the vacuum in cylinder 47 and chamber 45 and it is essential that said valve be unseated at the proper instant which varies with the length of the stroke but which has a direct ratio thereto. In order to maintain this desired ratio between the length of the piston stroke and the interval between operations of valve 59 the following structure has been provided.

Clamped to the bottom of member 83 is a cross arm 91 in which the threaded end 92 of rod 73 is suitably secured. The rod 73 has a guide bearing in the base 51 and also the top flange of cylinder 75. This rod also has a guide bearing in the lower flange of cylinder 75 and in the members 82 and 88 secured thereto. From the foregoing it will be apparent that when the member 83 is raised the rod 73 will be raised a like distance so that valve 59 will always trip when piston 76 reaches the bottom of its stroke. In this way there is eliminated any danger of imperfect adjustment of the parts which may have a harmful effect on the mechanism. The guide rods 68 preclude rotatory movement of the piston 54 and the key 85 precludes rotation of the member 83 and the arm 91 associated therewith, therefore, the end 71 of valve stem 60 and the end 72 of trip rod 73 will always meet when the piston is lowered.

It will be noted that the clay tube 19 remains stationary in its adjusted position during operation so that there is no opportunity for that portion of the tube which contacts with the glass to become chilled or cold and to thereby chill any of the molten glass 15 which would have the derogatory result of causing the articles manufactured to be streaked or wavy. It should also be noted that the tube 19 may be lowered through the agency of hand wheel 32 so as to completely shut off the flow of glass from the normal well 14, in the event that the machine is to be stopped.

The speed of the machine, of which the mechanism that has been described is a part, varies with the character of the glass being delivered and the size of the articles being manufactured, a cycle of movements being performed at each delivery of a gathering 12. By my invention it is possible to vary the movements of the control piston 54, irrespective of the speed of the machine. Thus, as has been described, the length of stroke of this piston can be changed at will; the quickness or speed of the individual stroke, as distinguished from the speed incident to the speed of the machine, that is the length of time between successive strokes, can be varied; and the speed or quickness of the stroke in one direction as compared with its speed or quickness in the other direction can be varied, permitting a relatively faster movement for compression than for creation of vacuum, and vice versa.

The operation of the device is as follows: The bottom of the tube 20 is adjustable away from the top of insert 10 within certain limits. The maximum distance must be such that the area between the bottom of tube and the top of the insert is relatively less than the area in the chamber 45 above the normal level of the glass. The quantity of glass to be discharged in each gathering is governed by the displacement in the cylinder 47, or in other words by regulating the length of the stroke of the piston 54. Assuming now that the clay tube 19 has been positioned in its proper place and that the length of the stroke of piston 54 has been regulated by turning the hand wheel 86, the supply of air under pressure is connected to pipe 77 and tube 78 and the intermittent charges of air drive piston 76 alternately to the opposite ends of its stroke. Assuming that the piston 76 is at its lower limit, it follows that the piston 54 will also have reached its lower limit of travel and that the end 71 of valve stem 60 is being pushed up against the resistance of spring 69 so that the valve 59 is open and chamber 45 in tube 19 communicates with the atmosphere through reduced bore 44, flanged tube 41, flexible tube 46, the upper end of cylinder 47, through the bore controlled by valve 59, and out into the atmosphere through the bottom of cylinder 47 and the openings 50 in the support 49. As the piston 76 is moved upwardly in the opposite direction by air under pressure coming through flexible tubes 78, bore 90, in the member 83 into the bottom of the cylinder 75, the piston 54 is again raised carrying the end 71 of stem 60 away from the trip 72 and permitting the valve 59 to seat. The piston 54 is now sealed. The air above piston 54 and in the chamber 45 of tube 19 is now compressed as the piston 54 moves toward the top of cylinder 47. This pressure is transmitted to the glass within the chamber 45 and assists gravity in keeping a maximum flow of molten glass through the port 11 thereby providing uniformly shaped gatherings of glass. At the time the gathering of the proper weight and form protrudes from the discharge port 11, the end 64 of valve 62 contacts the face 66 of the cylinder, thereby permitting the compressed air in the chamber 45 to rush out through tube 46, recess 57 in the piston, slot 67 and bore 63 alongside of the valve stem. At this instant the shears 74 cut off the gathering 12 before it becomes distorted and thready through the action of gravity alone. During this interval the air in chamber 45 has had an opportunity to communicate with the atmosphere and also to expand under the intense heat without effecting any movement or exerting any pressure on the glass in said chamber. The piston 54 now moves downwardly as air under pressure through pipe 77 exerts its force upon the top face of piston 76. As soon as piston 54 has withdrawn slightly from the face 66 of cylinder 47, valve 62 again seats whereupon the cylinder 47 above the piston is again sealed and as it continues its downward movement, tends to create a vacuum in chamber 45 so that the glass in said chamber is raised to a higher level, thereby assisting the normal force of gravity to permit the flow of hot glass about the bottom 20 of the tube and at the same time lifts the severed end off of the shear blades. During the downward stroke of piston 54 there is no discharge of glass so that there is thus provided an interval during which the molds may be replaced to receive a fresh gathering of glass. Just prior to the time that the piston 76 reaches its lower limit the end 71 of valve stem 60 abuts the trip 72, opening valve 59 breaking the vacuum in chamber 45 and permitting the atmosphere to enter. At this instant the normal force of gravity will start the flow of molten glass through discharge port 11 under substantially atmospheric conditions. The piston 54 is again raised whereupon valve 59 closes and piston 54 is again sealed. The piston again compresses the air in the chamber 45 and performs its operation as before.

While I have described herein but one practical embodiment of my invention I am aware that numerous modifications may be made within the purview of this invention.

Figure 2:
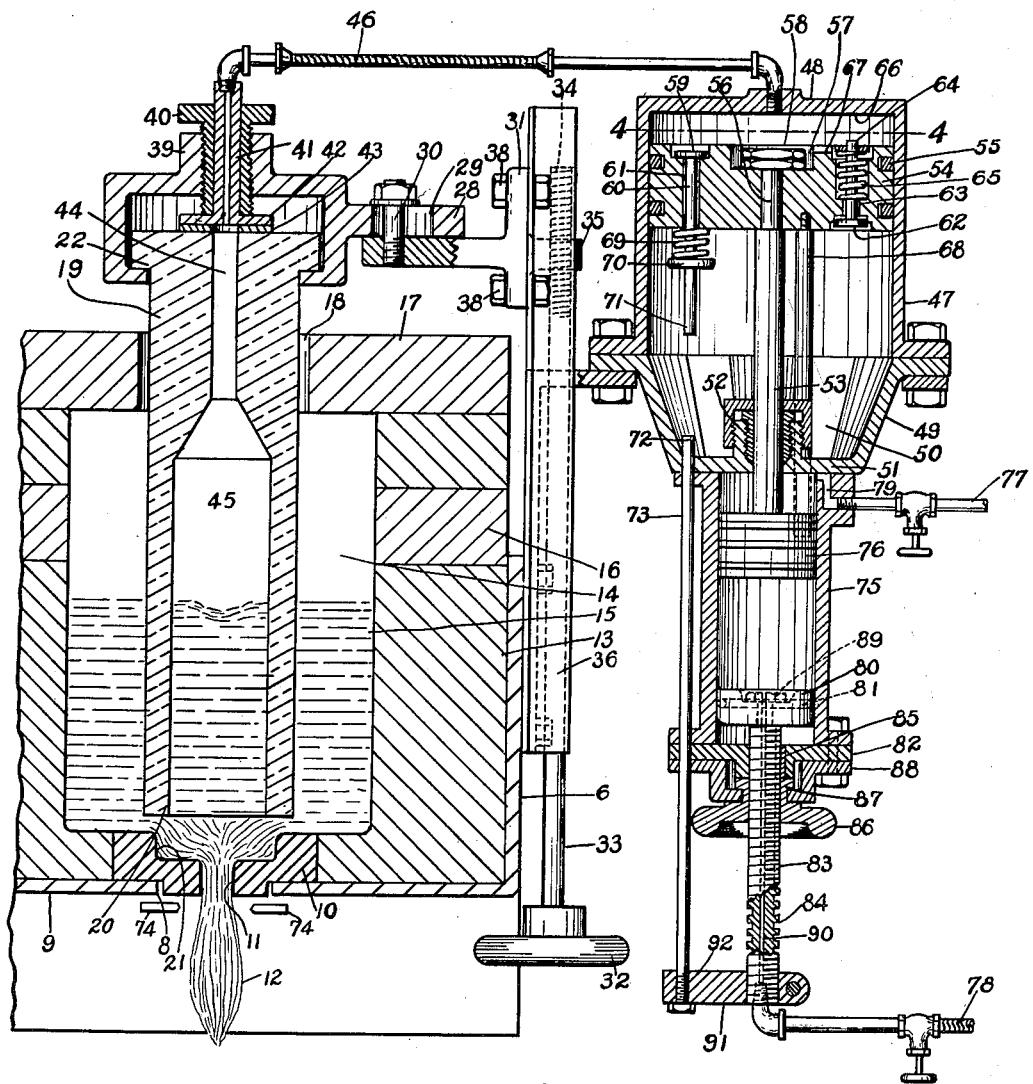
Fig. 2, is a cross sectional view taken on line 2—2 of Fig. 1.

It will be noted from Fig. 2 that I have provided valves which are located in the pipes 77 and 78 and by means of which the delivery of air to the cylinder 75 is controlled and by reason of this control the speed of operation of the piston 54 in either direction to be regulated. An important feature of my device is the regulation of the length of the stroke of the piston 54 as by this regulation I am enabled to inject into or withdraw from the tube 19 a predetermined number of cubic inches of air and when the device is once set for a certain job, this volume remains constant regardless of the speed at which the piston is operated. In other words, the air pressure in a certain job above and below atmosphere, never varies, but remains constant for all speeds of piston movement and by releasing this pressure at each end of the stroke, an accumulation of plus or minus pressure is prevented. This would not be the case were either pressure released before that time because then one pressure would be greater than the other and it would therefore build up, and in a short time nullify the other pressure. It is also important that the weight of the head of glass surrounding the tube be greater than the air pressure in the tube, because otherwise air would be blown out through the glass in the well on the plus pressure and sucked into the tube from the well on the minus pressure and thereby make it impossible to properly feed the glass through the outlet or to draw glass into the tube.

I therefore do not limit myself to the exact disclosure herein but claim my invention broadly within the scope of the appended claims.

I do not in this case claim the method which is carried out by the machine herein illustrated, described and claimed, which consists in feeding glass into molds by imparting thereto alternately extrusive and intrusive movements by means of air pressure that is alternately above and below normal pressure, automatically restoring atmospheric pressure at the end of each movement, and severing a predetermined quantity of glass from the body thereof at the end of each extrusive movement; nor such method when expressed in more specific terms, as such subject matter has been presented and claimed by me in an application, Serial No. 118,915, filed June 28th, 1926 as a division of this case.

What I claim is:—

1. In a device of the class described the combination with a container for molten glass and having a discharge port in its bottom, of a tubular member adapted to contain molten glass and disposed in spaced apart alignment with the port in the container and communicating at its bottom with said container, means for successively compressing the air in the tube, means carried by said compressing means for permitting communication between the atmosphere and the interior of the tube for releasing the pressure created therein, said compressing means also adapted for exhausting air from the tube, and means carried by said compressing means for again establishing communication between the atmosphere and the interior of the tube for releasing the vacuum created therein.

2. In a device of the class described the combination with a container for molten glass and having a discharge port therein, of a tubular member vertically disposed in spaced alignment with the port in the container and communicating at its bottom with the container, means for successively compressing and exhausting air in the tube, means carried by said compressing and exhausting means for permitting communication between the atmosphere and the interior of the tube after the air has been compressed therein, and means carried by said compressing and exhausting means for establishing communication between the atmosphere and the interior of the tube after the air therein has been exhausted, said means for establishing communication between the tube and atmosphere being adapted to impart their cycles of operation as stated.

3. In a device of the class described the combination of means in constant communication with a glass furnace for containing molten glass and having a discharge port therein, and maintaining a predetermined depth of molten glass in said container, a tubular member open at its bottom extending into the glass in said container and being in alignment with and spaced apart from the port in said container means, said tubular member adapted to contain molten glass in equilibrium with the molten glass in the container, air control means connected with the opposite end of the tubular member for successively compressing air therein for discharging glass through the port in the container means, means carried by said air control means for providing communication between the tubular member and the atmosphere for relieving the compression in the tubular member, said air control means also adapted to exhaust air from the tubular member for reversing the flow of glass through the discharge port in the container means, means carried by said air control means for providing communication between the tubular member and atmosphere for relieving the vacuum created in said tubular member, and means for regulating the speed of the air control means.

4. In a device of the class described the combination of a glass container having a submerged discharge port therein, molten glass having a predetermined head in said container, a tubular member mounted for normally fixed adjustment above the port in said container and in vertical alignment therewith, air control means comprising a cylinder communicating with the top of the tubular member and having a reciprocating piston therein, the area of the piston being materially greater than the area of the exposed surface of molten glass within the tubular member, means for reciprocating the piston to create alternate compression and vacuum conditions in the said tubular member, and means whereby the alternate compression and vacuum conditions created by the piston may be relieved at the ends of the strokes of the piston.

5. In a device of the class described the combination of a glass container having a submerged discharge port in its bottom, a body of molten glass of a predetermined head in said container, a tubular member mounted for adjustment above the port in said container and in communication with the glass therein at its bottom, the lower end of said tubular member being submerged in the glass to a predetermined depth, a cylinder communicating with the top of the tubular member and having a reciprocating piston therein, means for operating the piston whereby air in the tubular member is alternately compressed and exhausted therefrom, and means carried by said piston in fixed relations for restoring atmospheric pressure in said tubular member at the absolute end of each compression and exhaustion stroke.

6. In a device of the class described a well having a predetermined head of molten glass therein, a submerged discharge port formed in said well, a tubular member extending into said glass and located above and in alignment with said port, means for introducing a predetermined volume of air into the upper end of said tubular member and for withdrawing a volume of air from said tubular member equal to that introduced comprising a control piston, means for regulating the quickness of the movements of the control piston independent of the speed of the operation of the device as a whole and without changing the volume of air delivered at each stroke of the control piston, a conduit between the control means and the said tubular member that is free and unvalved, and means for opening said tube to atmosphere at the end of the introduction and withdrawal.

7. In a device of the class described a well adapted to contain molten glass, an outlet port formed in the bottom of said well, a tubular member extending into said well in alignment with said port and communicating at its bottom with the glass in the well, said tubular member adapted to contain a column of glass in equilibrium with the glass in said well, means for introducing a predetermined volume of air into said tubular member above the glass therein and for withdrawing from said tube an amount of air equal in volume to that previously introduced, comprising a control piston and a cylinder in which it works, means for opening to atmosphere the said cylinder at the ends of the strokes of the piston, such last said means being located within the said cylinder.

8. In a device of the class described a well adapted to contain molten glass, an outlet port formed in the bottom of said well, a tubular member extending into said well in alignment with said port and communicating at its bottom with the glass in the well, said tubular member adapted to contain a column of glass in equilibrium with the glass in said well, means for introducing a predetermined volume of air into said tubular member above the glass thereof, means for opening said tubular member to atmosphere after said volume has been introduced, means for withdrawing from said tube a volume of air equal to that previously introduced, means for opening said tubular member to atmosphere after said volume has been withdrawn, means for regulating the quickness of the movements of the air introducing and withdrawing means irrespective of the speed of operation of the device as a whole, without changing the volumes of air moved at each operation, and means for regulating the volumes of air moved at each operation without changing the quickness of movements of the air-moving means.

9. In a device of the class described a well having a predetermined head of molten glass therein, a submerged discharge port formed in said well, a tubular member extending into said glass and located above and in alignment with said port, means for introducing a predetermined volume of air into the upper end of said tubular member, means for withdrawing a volume of air from said tubular member equal to that introduced, means for opening said tube to atmosphere at the end of the introduction and withdrawal, and means for varying the volume of air withdrawn and introduced without varying the quickness of the movements causing the introduction and withdrawal of the air.

10. In a device of the class described, a well having a predetermined head of molten glass therein, a submerged discharge port formed in said well, a tubular member extending into said glass and located above and in alignment with said port, means for introducing a predetermined volume of air into the upper end of said tubular member, means for withdrawing a volume of air from said tubular member equal to that introduced, means for opening said tube to atmosphere at the end of the introduction and withdrawal, means for regulating the speed at which the volume of air is introduced and withdrawn, and means for regulating the volume of air withdrawn and introduced without necessitating change in the quickness of introduction and withdrawal of the air, these adjustments being independent one of the other and of the speed of operation of the device as a whole.

11. A device of the class described comprising the combination with a container having a constant predetermined head of glass therein, and a discharge port in its bottom, of a hollow member in vertical alignment with said port and having its lower end extending into said molten glass, means for adjusting said hollow member to and from said port whereby the passage of glass through said port and to said hollow member is regulated, a conduit attached to the upper end of the hollow member, reciprocating means associated with said conduit for delivering and exhausting air to and from said hollow member whereby extrusive and intrusive pulsations are alternately imparted to the glass in the hollow members, means carried by said reciprocating means and operated alternately at the end of each reciprocation for relieving the pressure and vacuum created thereby, means for varying the quickness of operation of said reciprocating means while it is in operation without changing the length of the reciprocation, and means for varying the length of the reciprocation without increasing its speed and while it is in operation.

12. In an apparatus for controlling the feed of molten glass, the combination of a tubular member with an open end adapted to be immersed in a body of molten glass above a discharge opening, an air conduit leading from the upper portion of the said tube, a cylinder with which the said conduit connects, a control piston in the cylinder, a power piston and cylinder in which it works for moving the control piston, adjustable means by which the effective length of the power cylinder may be changed at will, a valve carried by the control piston for relieving the vacuum produced by movement of the control piston in one direction, and means to operate the said valve at the end of the vacuum stroke of the control piston, such means being connected with the means that regulate the effective length of the power cylinder whereby the position of such means is correspondingly and synchronously changed with the adjusting means in the power cylinder.

13. In an apparatus for controlling the feed of molten glass, the combination of a tubular member with an open end adapted to be immersed in a body of molten glass above a discharge opening, an air conduit leading from the upper portion of the said tube, a cylinder with which the conduit connects, a control piston movable in the said cylinder, means for reciprocating the piston to cause alternate conditions of pressure and vacuum in the tubular member above the molten glass therein, control means for varying the quickness of movement of the control piston to produce pressure conditions, and other control means to vary the quickness of movement of the piston to produce vacuum conditions, such control means being operable independently of each other and of the speed of the apparatus as a whole.

In testimony whereof, I have hereunto subscribed my name this 1st day of May, 1926.

SAMUEL G. STUCKEY.